United States Patent

Gelin

[15] 3,694,541
[45] Sept. 26, 1972

[54] METHOD FOR FORMING A MOLDED ARTICLE

[72] Inventor: Robert J. Gelin, Newark, Ohio

[73] Assignee: Owens-Corning Fiberglas Corporation

[22] Filed: July 6, 1970

[21] Appl. No.: 52,662

Related U.S. Application Data

[62] Division of Ser. No. 686,402, Nov. 29, 1967, Pat. No. 3,531,830.

[52] U.S. Cl. ................... 264/294, 264/320, 264/325
[51] Int. Cl. ............................................. B29c 3/06
[58] Field of Search ...264/325, 294, 296, 320; 18/16

[56] References Cited

UNITED STATES PATENTS

| | | | |
|---|---|---|---|
| 3,242,533 | 3/1966 | Wintriss | 18/16 |
| 3,464,089 | 9/1969 | Smith | 18/16.7 |
| 2,013,702 | 9/1935 | Smidth | 264/294 |
| 3,567,814 | 3/1971 | Glesner | 264/137 |
| 2,198,269 | 4/1940 | Linzell | 264/320 |
| 3,132,378 | 5/1964 | Johannigman | 18/16 |
| 2,313,623 | 3/1943 | Bungay | 18/16 |
| 3,485,908 | 12/1969 | Burger | 264/325 X |

Primary Examiner—Robert F. White
Assistant Examiner—Richard R. Kucia
Attorney—Staelin & Overman and Donald R. Fraser

[57] ABSTRACT

A method of forming an article of formable material wherein the formable material is positioned between registering die elements of a press. The die elements are advanced toward each other to a point of separation determined by releasable indexing stop means. The die elements are retained in the separated aligned condition determined by the indexing stop means for a predetermined time cycle, after which time the stop means are released allowing the full pressure of the press to be applied to the formable material between the die elements to complete the forming operation. The die elements are then separated and the molded article is removed.

5 Claims, 7 Drawing Figures

INVENTOR.
ROBERT J. GELIN

INVENTOR.
ROBERT J. GELIN

INVENTOR.
ROBERT J. GELIN
BY
ATTORNEYS

METHOD FOR FORMING A MOLDED ARTICLE

This is a division of co-pending application, Ser. No. 686,402, filed Nov. 29, 1967 now U.S. Pat. No. 3,531,830.

BACKGROUND OF THE INVENTION

In the field of forming articles of plastic material with matched die molding systems, problems have been encountered in obtaining the desired thickness control and appearance of the exposed surface of the article being formed. In the type of matched die molding systems referred to as fixed stop molding, it has been possible to obtain satisfactory thickness control, but the exposed surface of the molded article was porous and relatively rough. The porosity and roughness in surface configuration of the molded article has been improved by the employment of the so called positive pressure type molding operation wherein the full pressure of the press is permitted to be applied to the material being molded throughout the molding cycle. However, through the employment of the latter type operation, the thickness control of the molded article was difficult to obtain.

It is an object of the present invention to provide a method and apparatus for forming a molded article wherein the thickness and the exposed surface of the molded article may be readily controlled.

With the present invention it is possible to produce molded articles wherein the thickness of the article may be readily controlled, and the desired smooth non-porous surface configuration may be achieved without the need of extremely precise and rigid press equipment.

SUMMARY

The above object of the invention is achieved by a forming operation comprising the steps of positioning formable material between registering die elements of a press; advancing the die elements toward each other; establishing separation of the die elements by indexing stop means which further serve to maintain parallelism and alignment of the die elements; releasing the indexing stop means to sustain pressure between the die elements on the formable material; separating die elements; and removing the molded article of the formable material from between the die elements.

Typically the aforementioned operation may be achieved by a press including registering die elements; means to introduce a quantity of formable material between the die elements; means to advance the die elements into cooperative relationship for partially forming the formable material; a plurality of spacing stop means arranged to provide a stable equilibrium to define a predetermined spacing of the cooperating die elements across the face of the die elements; sensing means associated with the stop means responsive to a predetermined spacing between the die elements; means responsive to the response of all of the sensing means; a timer defining an interval initiated in response to the last mentioned means; means for establishing curing parameters between the die mold for the formable material in response to the response of the last mentioned means; means responsive to the timer upon expiration of the interval for releasing the spacing stop means whereby the registering die elements further compact the formable material; and means for separating the die elements.

BRIEF DESCRIPTION OF THE DRAWINGS

The above objects and advantages of the invention will become readily apparent to one skilled in the art by reading the following detailed description of an embodiment of the invention when considered in the light of the accompanying drawings in which.

DESCRIPTION OF AN EMBODIMENT OF THE INVENTION

Figure 1:
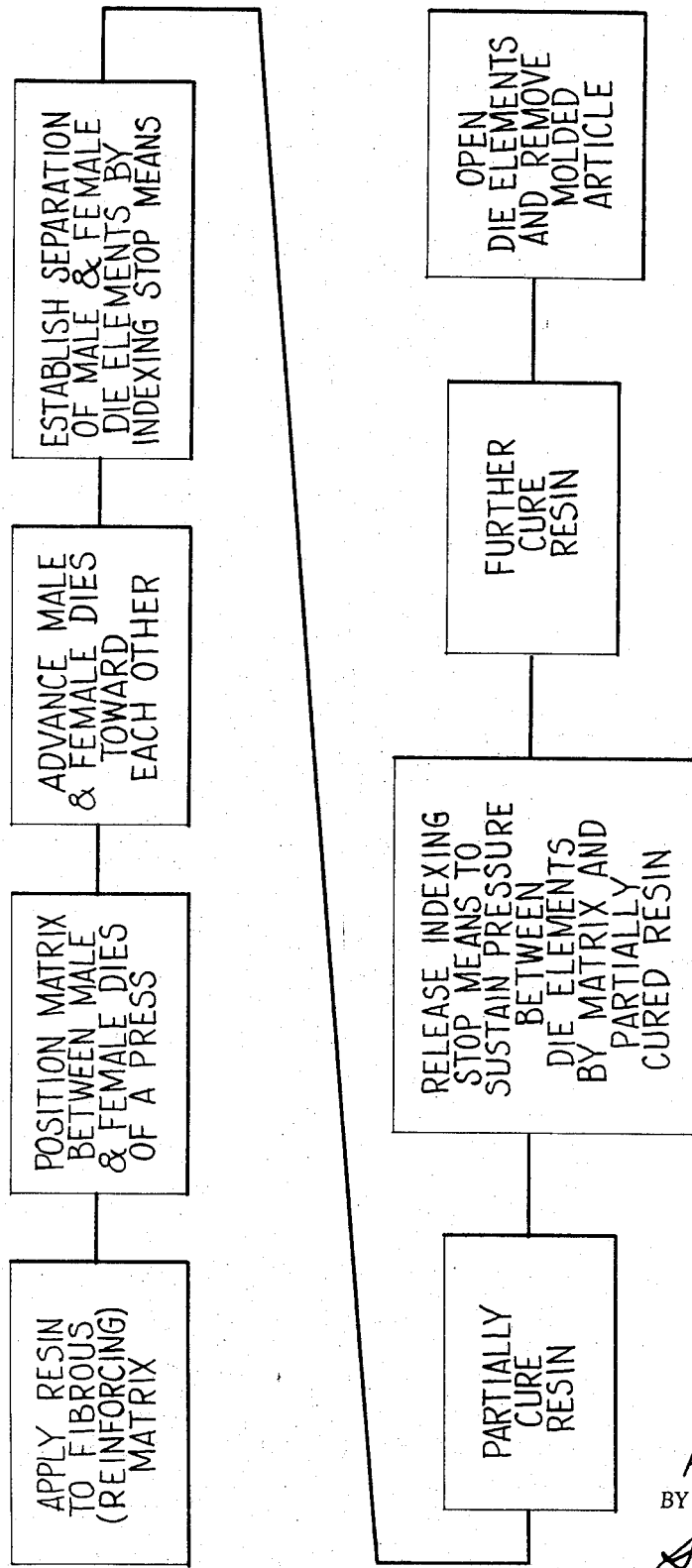
FIG. 1 is a block diagram of the method of the invention.

The invention may be best understood by initially referring to FIG. 1 which illustrates, in block diagram form, the sequential steps of one application of the process of the invention. It will be understood that the invention is particularly adaptable to producing articles formed of a thermosetting resin which is reinforced with a matrix of glass fibers. While specific mention will be made throughout the description of the use of a thermosetting resin material, it will be appreciated that the process could be employed with thermoplastic resin.

The first step of the process comprises applying a metered quantity of uncured resin material to a reinforcing matrix of glass fiber material which is typically maintained in an initial shape by a resin binder such as, for example, phenol formaldehyde. The matrix with the uncured resin is then placed or positioned between cooperating male and female die elements of a molding press. The press cycle is then commenced causing the male and female dies to advance toward each other. Usually, the bolster element of the press carrying the upper die element, which we may consider in the illustrated embodiment as being the male die element, is designed to remain stationary; while the lower bolster which carries the cooperating and registering female die is mounted to reciprocate toward and away from the bolster element by a hydraulic piston arrangement. The lower bolster member is typically guided during its reciprocation by four spaced apart stanchions. The sliding fit between the stanchions and the cooperating reciprocating bolster is such that a certain degree of out of parallel alignment can occur during the travel thereof. The misalignment of the bolsters is typically occassioned by the forces of the material being formed and the shape of the cooperating die elements. It will be obvious that in the event a large quantity of the resin material were located at one side of the die elements, the lower bolster could be forced out of parallel alignment with the upper bolster as the die elements commence the forming of the article being molded. Such misalignment of the bolsters will obviously effect a similar misalignment between the registering male and female die elements resulting in a molded article which does not have the desired wall thicknesses. One of the primary objectives of this invention is to remedy the misalignment problem.

Continuing with the description of the method, there is next established a separation and alignment between the male and female die elements to produce a stable equilibrium therebetween, while aligning the male and female die elements. During this portion of the cycle, the resin material has flowed throughout the fiber glass matrix and commences its curing process. At the completion of a predetermined time interval, determined primarily by the type and quantity of resin being employed and the heat of the dies, indexing stops which established the aforementioned separation between the male and female die elements are released to sustain pressure between the die elements on the fiber glass reinforcing matrix and the partially cured resin. In this condition, the full pressure of the press is applied to and sustained by the matrix and the partially cured resin. The cycle continues to further cure the resin. When the resin is cured sufficiently, the die elements are opened and the molded article is removed.

Figure 2:
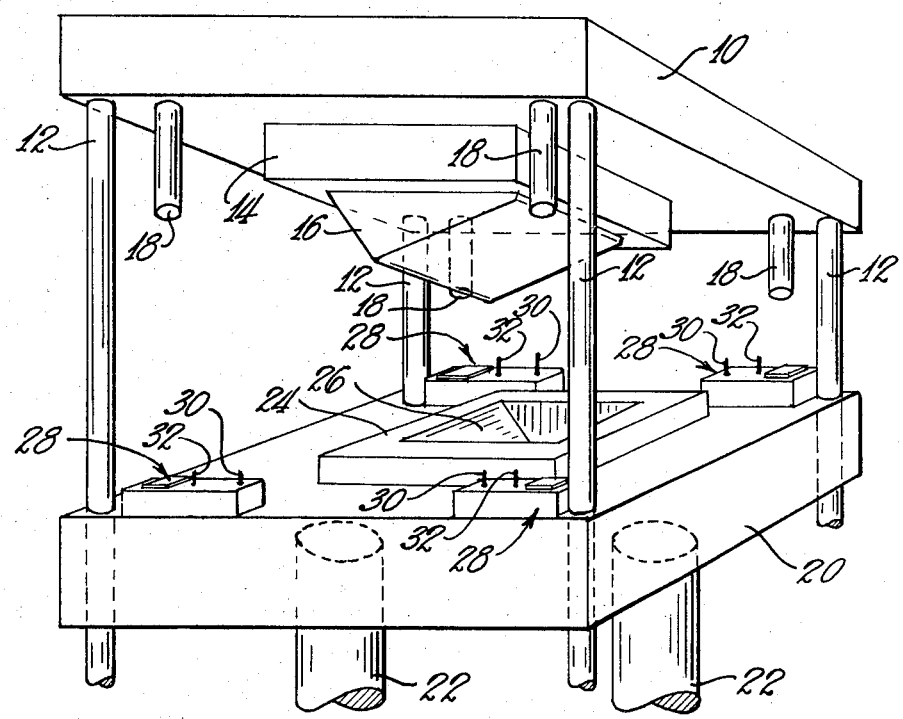
FIG. 2 is a perspective view of a press apparatus incorporating the principles of the invention.
Figure 3:
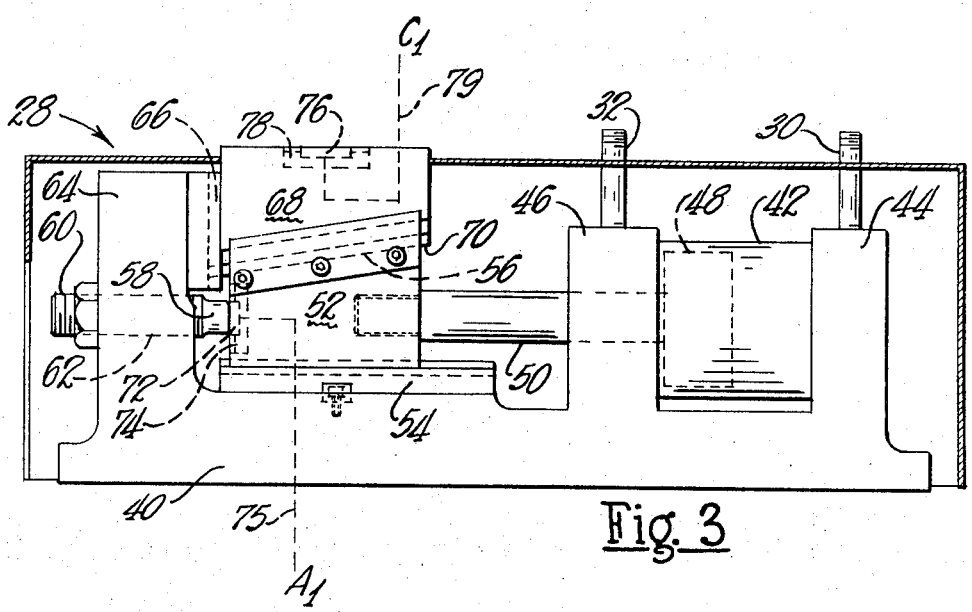
FIG. 3 is an enlarged elevational view of one of the retractable stop mechanisms employed in the apparatus illustrated in FIG. 2.

FIGS. 2 and 3 illustrate press apparatus incorporating features of the invention having the ability to achieve the above referred to method. More specifically, there is illustrated a press apparatus comprising a fixed bolster 10 which is fixedly supported by the upper ends of a plurality of vertically extending stanchions or columns 12. The bottom or lower ends of the stanchions 12 are supported in a floor engaging base member, not shown. The under-surface of the fixed bolster 10 is provided with a heated platen 14 to which is secured, in a conventional manner, a male die element 16. Near each of the corners of the fixed bolster 10, there is a depending post 18, the function of which will be explained in greater detail hereinafter.

A lower bolster 20 is disposed on the aforementioned stanchions 12 for reciprocating movement thereon which is typically accomplished by means of a pair of spaced apart hydraulically actuated piston members 22. The upper surface of the bolster 20 is provided with heated platen 24 to which is secured in a conventional manner a female die element 26. Near each corner of the bolster 20 and in registry with the respective ones of the depending posts 18 is a releasable or retractable stop unit 28, the structure of which is illustrated in greater detail with reference to a description of the apparatus illustrated in FIG. 3. However, basically, each stop unit 28 is positioned to be engaged by the depending posts 28 of the fixed bolster 10 at a certain point during the upward travel of the movable bolster 20. Each of the stop units 28 is provided with a pressure fluid actuated stop releasing mechanism in communication with a source of pressure fluid through the lines 30 and 32.

With specific reference to FIG. 3 there is illustrated one of the stop units 28 which includes a base member 40 which is typically fixedly supported by the upper surface of the movable bolster 20. A reciprocating pressure fluid actuated motor 42 is suitably secured to the base 40 by means of spaced apart upstanding bracket members 44 and 46. The pressure fluid actuated motor is provided with a piston 48 to which is connected a piston rod 50 which extends outwardly of the housing of the motor 42. The motor 42 is connected to a source of pressure fluid through the lines 30 and 32. The outer end of the piston rod 50 is connected to a camming member 52 mounted for sliding reciprocal movement on a slide guide 54 connected to the base 40. The camming member 52 is provided with an inclined upper surface 56. Extended movement of the camming member 52 is limited by a horizontally adjustable stop member 58 which has an externally threaded portion 60 threadably received within an internal bore 62 formed in an upstanding end portion 64 of the base 40.

The inner face of the upstanding end portion 64 is provided with a vertically extending way 66 which slidably receives a suitable shaped tongue member of a vertically movable stop 68. The stop 68 has an inclined bottom surface 70 which is adapted to engage the inclined upper surface 56 of the camming member 52. It will be appreciated that when pressure fluid is introduced into the fluid motor 42 through the line 30, the piston 48, the piston rod 50, and the camming member 52 are moved to the position in contact with the innermost end of the adjustable stop member 58. When the elements of the system are in the above position, the vertically movable stop 68 is in an elevated position as illustrated in FIG. 3. However, when pressure fluid is introduced into the fluid motor 42 through the line 32, the piston 48, the piston rod 50, and the camming member 52 is retracted and moved to the right in FIG. 3. Such movement will effectively allow the vertically movable stop 68 to move downwardly in the way 66 due to the interaction of the cooperating inclined surfaces 56 and 70 of the camming member 52 and the vertically movable stop 68, respectively. Manifestly, during the operation of the fluid motor 42, in order to allow for the movement of the piston 48 by the action of pressure fluid, when such pressure fluid is introduced through either line 30 or 32, the other line must allow for the escape of fluid from the motor.

The face of the camming member 52, adjacent the adjustable stop member 58, is provided with a switch contact 72 which is electrically insulated from the member 52 by an insulating material 74. A suitable electrical conducting lead 75 is provided to connect the switch contact 72 to a control panel mounted lamp as is illustrated and explained in reference to FIG. 4. The upper face of the vertically movable stop 68 is provided with a similar switch contact 76 which is electrically insulated from the stop 68 by an insulating material 78. A suitable electrical conducting lead 79 is provided to connect the switch contact 76 to a control panel lamp as is illustrated and described in reference to FIG. 4.

Figure 4:
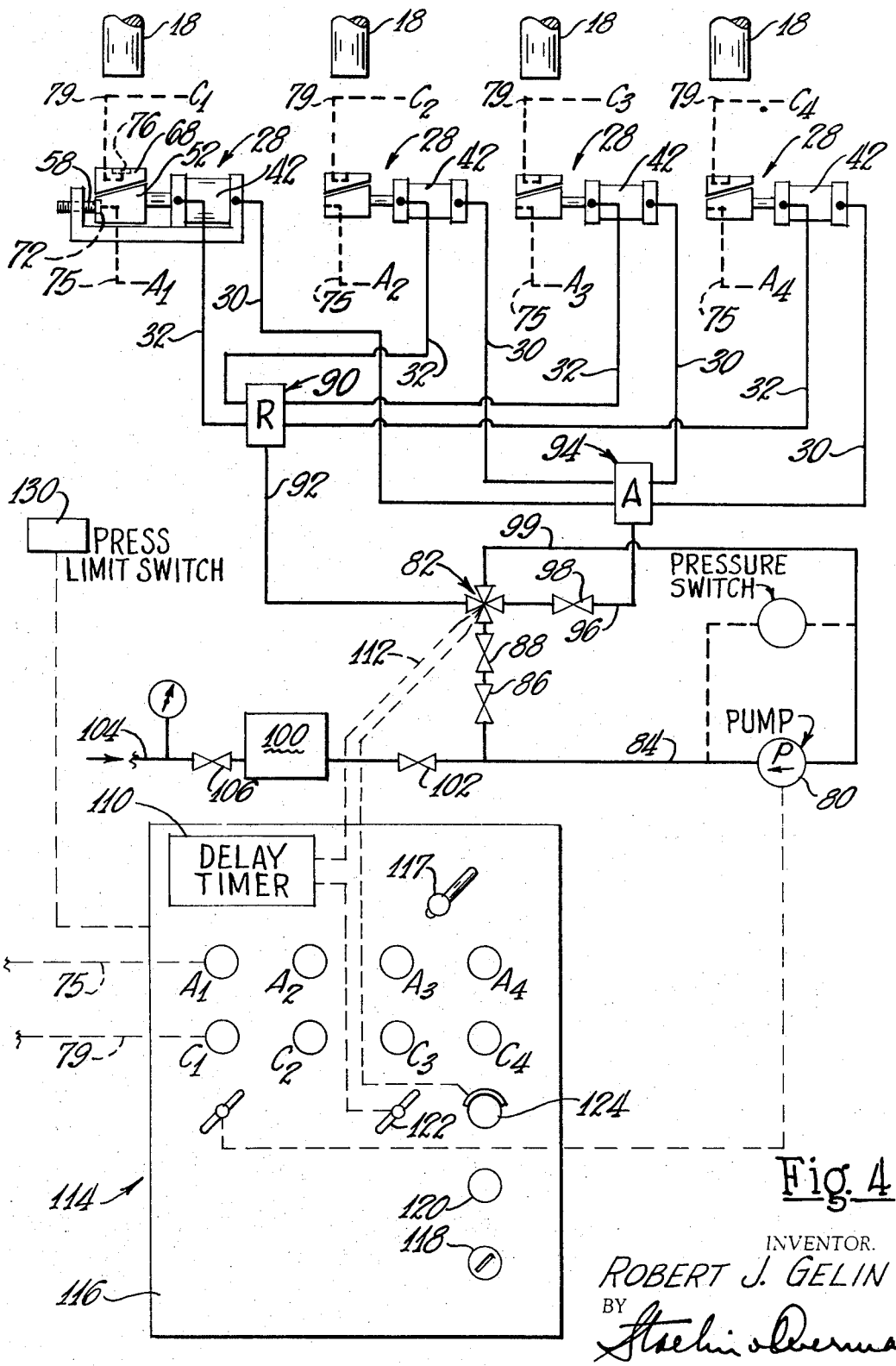
FIG. 4 is a schematic illustration of a system for operating the apparatus illustrated in FIGS. 2 and 3.

The pressure fluid system for operating the pressure fluid actuated motors 42 of the retractable stop units 28 is illustrated schematically in FIG. 4. The system includes a motor driven positive displacement pump 80 having an outlet and an inlet. The outlet of the pump 80 is connected to one port of a four-way solenoid actuated valve 82 through a line 84 having a check valve 86 and a flow control regulator valve 88. The solenoid actuated valve 82 has two pressure fluid ports; one of which is connected to a "retract" manifold 90 through a line 92, and the other of which is connected to an "advance" manifold 94 through a line 96 having a flow control regulator valve 98. One of the other ports of the four-way solenoid valve 82 is connected to the inlet of the pump 80 through a line 99. Each of the manifolds 90 and 94 is of substantially the same construction. The "retract" manifold 90 is provided with four ports which are respectively connected to the pressure fluid actuated motors 42 of the retractable stop units 28 through the lines 32. The "advance" manifold 90 is likewise provided with four ports which are respectively connected to the pressure fluid actuated motors 42 of the retractable stop units 28 through the lines 30.

In order to militate against any pressure surges in the system, there is typically provided a pressure accumulator 100 which is connected to the line 84 through a control valve 102. The system may be recharged with pressure fluid through the line 104 which is connected to the pressure accumulator 100 through a control valve 106.

The four-way solenoid actuated valve 82 is coupled to a source of power through a delay timer circuit 110 by an electrical conductor 112. Normally, when the four-way solenoid actuated valve 82 is deenergized, the armature thereof positions the valve to direct pressure fluid to the "retract" manifold 90 through the lines 92 to cause the stops 68 of the retractable stop units 28 to be in a lowered position. The delay timer circuit 110 is a portion of the electrical control circuitry generally indicated by reference numeral 114 which includes a control panel 116 having a main power switch 117, a key-operated power switch 118, and a pilot lamp 120 which is illuminated when the power switch 118 is in an "on" position. The delay timer circuit 110 is connected to the power supply through a stop contact actuator switch 122. A manually actuated switch 124 is connected between a source of electrical power and the four-way solenoid actuated valve 82, and may be employed to effect a manual retract operation thereof, in case the valve 82 is deenergized as will become apparent from the following description.

The switch contacts 72 of the camming members 52 of each of the retractable stop units 28 are connected to respective pilot lamps $A_{,1}$, $A_2$, $A_3$, $A_4$ on the control panel through respective conductors 75; while the switch contacts 76 of the vertically movable stops 68 of each of the retractable stop units 28 are connected to respective pilot lamps $C_1^1$, $C_2^1$, $C_3^1$, $C_4^1$ on the control panel 114 through respective conductors 79.

A normally open press limit switch 130, schematically illustrated in FIG. 4, is mounted adjacent the movable lower platen 20 of the press apparatus illustrated in FIG. 2 and is closed by the platen 20 as the press apparatus opens during each molding cycle.

In the operation of the system illustrated in FIGS. 2, 3 and 4, the main power switch 117 and the key operated switch 118 are turned to "on" positions, thus energizing the associated electrical circuitry. With current flowing in the circuit, the armature of the solenoid actuated valve 82 causes the pressure fluid being pumped by the pump 80 to be directed into the "advance" manifold 94 through the line 96, and the flow control valve 98. From the manifold 94, the pressure fluid is directed to the motors 42 of the retractable stop units 28 through the lines 30 causing the vertically movable stops 68 to be raised. With the lower bolster 20 of the molding press in the position illustrated in FIG. 2, a fibrous reinforcing matrix containing a metered quantity of a thermosetting resin such as, for example, a styrene polyester, is inserted into the female die 26 and then movable bolster 20 is caused to advance to effect a registry in an aligned, separated condition between the female die 26 and the male die 16 secured to the fixed bolster 10.

As mentioned above, the system illustrated in FIG. 4 is effective initially to energize the four-way solenoid actuated valve 82 in such a fashion that the pressure fluid is introduced into the "advance" manifold 94, and thence through the lines 30 causing the camming member 52 of each of the retractable stop units 28 to move against the adjustable stops 58, the contacts 72 complete an electrical circuit energizing the respective pilot lamps $A_1$, $A_2$, $A_3$, $A_4$ which become lighted and indicate to the operator that the associated vertically movable stops 68 are in their raised position. As the molding cycle of the press continues, the movable bolster 20 is moved toward the fixed bolster 10 until the depending posts 18 contact the raise stops 68 of the retractable stop units 28. It has been found that in a typical installation, the depending posts are contacted sequentially by their respective stops 68 due to a slight inclination of the movable bolster 20 which is caused during the upward movement thereof on the stanchions 12. Manifestly, if the molding operation were to continue with the movable bolster 20 improperly aligned with the fixed bolster 10, the desired thickness control of the article being molded between the male and female die elements would not be achieved. When contact between all the depending posts 18 and their respective stops 68 occurs, the associated bolster 20 is aligned. It is at this stage of the operation that the resin which has flowed through the reinforcing fiber glass matrix, tends to conform to the configuration of the dies and the dies are positioned in aligned, separated condition.

Simultaneously, with the occurrence of the physical contact between the posts 18 and the stops 68, electrical circuits are completed by the switch contacts 76 through the conductors 79 effecting illumination of the pilot lamps $C_1$, $C_2$, $C_3$, $C_4$. Also, the electrical contacts 76 are connected to electrical relays which typically have their contacts arranged in series between the stop contact actuator switch 122 and the delay timer circuit 110. Upon completion of the circuits of each of the switch contacts 76 and with their respective relay contacts being closed, the delay timer circuit 110 is energized and commences its timing cycle. The timing cycle may be manually set to cycle through a range of the order of from 0–30 seconds and is determined by the type and/or quantity of resin being molded and the applied heat. Upon the expiration of the timing cycle of the delayed timer circuit 110, the current flow to the four-way solenoid actuated valve 82 is interrupted and the four-way solenoid actuated valve 82 is deenergized allowing the pressure fluid to flow to the "retract" manifolds 90 through the lines 92. From the manifold 90, the pressure fluid is directed to the retractable stop units 28 through the lines 32 to one side of the pistons 48 of the fluid motors 42. Simultaneously, the four-way solenoid actuated valve 82 allows the fluid on the opposite side of the pistons 48 of the fluid motors 42 to return to the inlet of the pump 80 through the lines 30, the "advance" manifold 94, the flow control valve 98, and the return line 99. The pressure fluid within the lines 32 causes the pistons 48 to be moved toward the right in FIG. 3, thereby moving the piston rods 5) and the associated camming members 52. As the camming members 52 move to the right, away from the adjustable stops 58, the vertically movable stops 68 of all of the retractable stop units 28 move downwardly away from the ends of the depending posts 18, thereby allowing the full molding pressure of the press to be applied on the article being molded between the cooperating die members 16 and 26. The molding pressure is maintained on the article between the dies until the press is opened.

Normally, after the desired molding interval, the movable bolster 20 is lowered and the molded article is typically released from the dies 16 and 26, either manually or automatically, as for example, by means of an air pressure release, and then the molded article is physically removed therefrom.

It will be appreciated that upon the downward movement of the movable stops 68, the associated switch contacts 76 are opened, deenergizing their associated relays and interrupting current flow to the delay timer circuit 110 allowing the same to automatically reset. During the downward movement of the movable bolster 20, the limit switch 130 is closed which effectively establishes a current flow through the solenoid actuated valve 82 causing the same to direct the pressure fluid to the "advance" manifold 94 through the flow control valve 98. From the manifold 94, the pressure fluid is than directed through the lines 30 to the fluid actuated motors 42 of the retractable stop units 28 to force the camming members 52 against the adjustable stops 58 to cam the vertically movable stops 68 upwardly to be ready for the next molding cycle. It will be understood that the flow control valve 98 is inserted in the fluid circuit to limit the flow of the fluid in the "advance" cycle, to in effect decrease the velocity with which the camming members 52 are moved into contact with the adjustable stops 58 and to avoid any damage which might otherwise occur.

The system described above and illustrated in FIG. 4 may include a normally opened pressure switch arrangement which will close when the pressure in the system falls below a predetermined value to energize the pump 80 to reestablish the desired pressure. When the pressure in the system is reestablished, such switch arrangement reopens deenergizing the pump 80.

While specific illustration has been made of the retractable stop units 28 being formed of a pair of relatively moving cooperating inclined surface elements to effect an elevation of retraction thereof, it will be appreciated that rotating eccentrically mounted devices could likewise be satisfactorily employed as retractable stop units. Although the operation described hereinabove has described the the molding press as being manually controlled, the operation, in production, would most likely include an automatic control system for opening and closing the movable molding press elements.

Figure 5:
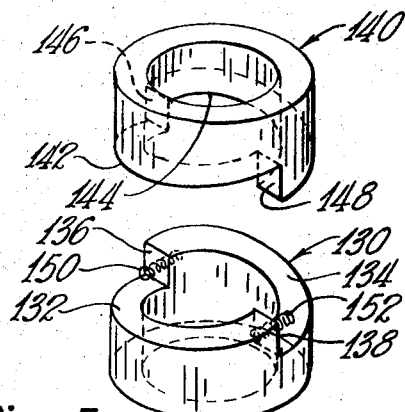
FIG. 5 is an exploded view of a modified form of the invention.
Figure 6:
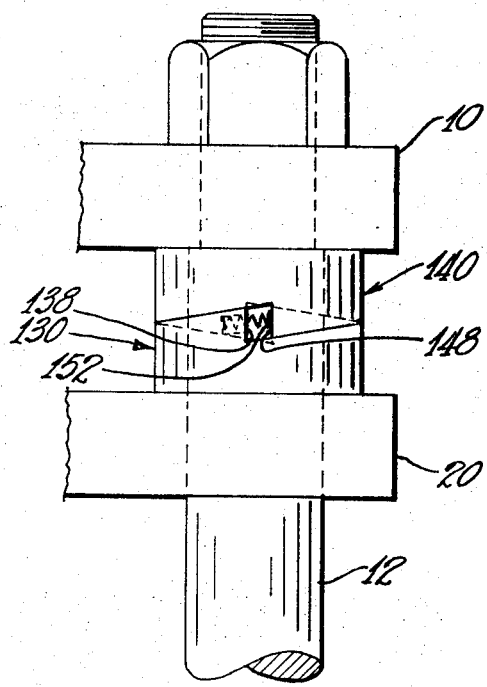
FIG. 6 is a fragmentary elevational view of the structure illustrated in FIG. 5 in an assembled condition.

A modified form of the invention is illustrated in FIGS. 5 and 6 wherein there is illustrated a means for aligning molding press bolsters. The apparatus of FIGS. 5 and 6 may be substituted for the retractable stop units 28 clearly illustrated in FIGS. 2, 3 and 4. Similar reference numerals will be used for similar parts explained herein before. More specifically, the apparatus comprises a lower hollow cylindrical member 130 secured to the lower movable bolster 20 in surround relation with the stanchions or columns 12. The uppermost surface of the member 130 is formed to have split helical camming surfaces 132 and 134 of the same pitch and interconnected by shoulders 136 and 130. An upper hollow cylindrical member 140 having the lowermost surface thereof formed to have split helical surfaces 142 and 144 of the same angular formation as the surfaces 132 and 134, respectively, of the lower member 130 is disposed in surrounding relation with the columns 12 in superposed relation on the lower member 130. The surfaces 142 and 144 of the upper member 140 are interconnected by shoulders 146 and 148. Helical compression springs 150 and 152 are employed to normally maintain the upper member 140 in a relative position with respect to the lower member 130 whereby the upper shoulders 146 and 148 are spaced from the respective lower shoulders 136 and 138.

In operation, when the lower bolster 20 is moved upwardly, the associated dies are advanced toward each other, and the upper surface of the upper member 140 is caused to contact the lower surface of the upper fixed bolster 10. At this point in the operation, the afore described modification, in effect, applies a resisting force to the continued closure of the bolsters 10 and 20, and since the resisting forces of each of the units is substantially equal, any misalignment between the upper and lower bolsters will be corrected and the desired alignment will be established. As the lower bolster 20 continues its upward travel, the compression springs 150 and 152 of each of the units are compressed by the rotation of the member 140 about the columns 12 caused by the camming action of the respective surfaces 132, 134, 142, and 144. As the member 140 rotates about the columns 12, the bolsters 10 and 20 may approach one another and the associated die elements may be closed to the desired degree.

It will be appreciated that it may be desired to vary the overall effective length of the members 130 and 140 in accordance with the size and the shape of the associated die elements. In certain instances, depending on the size of the die elements, the required spacing of the bolsters 10 and 12 for molding purposes will be quite small; while in other instances, the spacing will be large. This spacing may be satisfactorily achieved by varying the length of the individual members 130 and 140; or by the use of associated shims.

Figure 7:
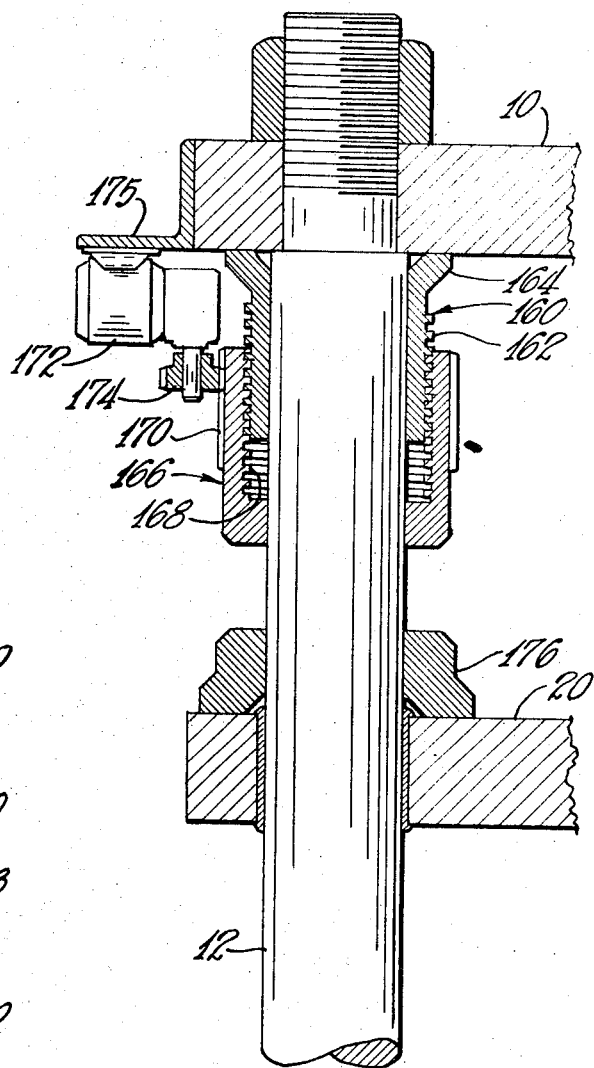
FIG. 7 is a fragmentary elevational view of another modified form of the invention.

Another modification of the invention is illustrated in FIG. 7 wherein similar reference numerals are used for similar parts described hereinbefore. More specifically, the apparatus comprises an adjustable stop means for assuring proper alignment for the bolsters and the die elements of a molding press. The adjustable stop means includes a jack screw 160 disposed about the stanchion 12 and fixedly supported adjacent the lower surface of the upper bolster 10. The jack screw 160 has an externally threaded section 162, the upper end of which terminates in an abutment 164. Mounted in threaded engagement with the jack screw 160 is a collar 166 having an internally threaded portion 168 and externally formed gear teeth 170. A stationary reversible motor 172, having a gear 174 drivingly engaging the gear teeth 170 of the collar 166, is suitably mounted on the press by bracket means 175. An abutment member 176 is disposed adjacent the upper surface of the lower bolster 20 in surrounding relation about the stanchion 12.

In use, it will be appreciated that the desired spacing between the upper bolster 10 and the lower bolster 20 can be readily achieved by energization of the motor 172 which will function to either extend or contract the overall effective length of the jack screw 160 and collar 166. Upon the closure of the press, the bolsters 10 and 12 and their associated die members are moved toward each other until physical contact occurs between the lower surface of the collar 166 and the upper surface of the abutment 176. It will be appreciated that in a typical operational cycle, after the collar 166 and the abutment 176 are in contact for a sufficient period to assure the desired alignment of the bolsters the die elements, the motor 176 could be backed off to move the collar upwardly to allow the full mold pressure to be applied to the article being molded.

By utilizing the above described apparatus, the exposed faces of the bolsters 10 and 20 are maintained free of interference to permit the maximum amount of the bolster face for the containment of the associated die elements. Further, by disposing the aligning means adjacent the marginal edges of the bolsters enables the aligning means to be located at the greatest feasible distance one from another thereby assuring maximum efficiency in the operation thereof.

From the above description it will be readily apparent that a method and apparatus has been produced which is capable of effectively achieving molded articles of controlled thickness and surface configuration. Existing molding presses may be inexpensively modified to accept the apparatus of the invention and practice the improved method. Manifestly, the invention provides an efficient means for effectively leveling the movable platen of a molding press prior to applying full molding pressure to the article being formed.

While the above description of the preferred embodiment of the invention has made reference to the use of a metered quantity of resin and a reinforcing matrix of glass fiber material, it will be appreciated that other types of formable material may be used, such as for example, a premixed combination of chopped glass fibers with resin, filler, and a catalyst.

What I claim is:

1. A method for forming molded articles in a press having a pair of matched die elements movable between an open position and a closed molding position and with at least one stop member movable from a remote retracted position to an advance position to interfere with movement of said die elements, comprising the steps of (1) placing said die elements in open position, (2) placing said stop member in its said advance position to define an intermediate position of said die elements between their said open and closed molding positions, (3) placing a charge of formable material between said die elements, (4) moving said die elements towards their said closed position until said stop member interferes with further movement, thereby causing said die elements to stop at said defined intermediate position and to attain a position of alignment with one another, (5) holding said die members at said intermediate position for a predetermined time while continuing to urge them towards said closed position, (6) and moving said stop member to its said retracted position, thereby permitting said die members to move to their said closed molding position.

2. A method for forming molded articles in a press having a pair of matched die elements movable between an open and a closed molding position and power means for exerting a force upon said die elements urging them toward said closed position and with at least one stop member movable from a remote retracted position to an advance position to interfere with movement of said die elements, comprising the steps of (1) placing said die elements in open position, (2) placing said stop member in its said advance position to define an intermediate position of said die elements between said open and closed positions, said intermediate position establishing a position of alignment for said die elements, (3) placing a charge of formable material between said die elements, (4) actuating said power means to urge said die elements towards said closed position until said stop member interferes with further movement thereby causing said die elements to stop at said defined intermediate position, (5) continuing to force said die elements together while in said intermediate position to attain a position of alignment with one another, (6) moving said stop member to its said retracted position, thereby permitting said aligned die members to move to their said closed molding position.

3. The method of claim 2 in which said die members are held at their said intermediate position for a predetermined time prior to moving said stop member to its said retracted position.

4. A method of forming molded articles in a press having a fixed die element and a matching die element movable from an open position to a closed molding position and power means for exerting a force upon said movable die element urging it towards its said closed molding position and at least one stop member movable from a retracted position to an advance position to interfere with movement of said movable die element, comprising the steps of (1) placing said movable die element in open position, (2) placing said stop member in its said advance position to define an intermediate position of said movable die element between its said open and closed position with said intermediate position establishing a position of alignment with said fixed die element, (3) placing a charge of formable material between said die elements, (4) actuating said power means to move said movable die element towards said closed position until said stop member interferes with further movement thereby causing said movable die element to stop at said defined intermediate position while being urged towards closed position, and to attain said position of alignment with said fixed die element, and (5) moving said stop member to its said retracted position, thereby permitting said aligned movable die element to move to its said closed position.

5. The method of claim 4 in which said movable die element is held at its said intermediate position for a predetermined time prior to moving said stop member to its said retracted position.

* * * * *